(12) United States Patent  
Leung et al.

(10) Patent No.: US 7,596,197 B1  
(45) Date of Patent: Sep. 29, 2009

(54) GAMMA SOURCE FOR ACTIVE INTERROGATION

(75) Inventors: Ka-Ngo Leung, Hercules, CA (US); Tak Pui Lou, Berkeley, CA (US); William A. Barletta, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 191 days.

(21) Appl. No.: 11/462,999

(22) Filed: Aug. 7, 2006

Related U.S. Application Data

(60) Provisional application No. 60/705,763, filed on Aug. 5, 2005.

(51) Int. Cl.
*G21B 1/00* (2006.01)

(52) U.S. Cl. .............. 376/108; 376/151; 376/190; 376/156; 250/492.1

(58) Field of Classification Search ............... 376/108, 376/151, 190, 156; 250/492.1
See application file for complete search history.

(56) References Cited

U.S. PATENT DOCUMENTS

| | | | | |
|---|---|---|---|---|
| 3,281,617 A | * | 10/1966 | Wood | 376/116 |
| 3,417,245 A | * | 12/1968 | Schmidt | 376/109 |
| 4,447,732 A | | 5/1984 | Leung et al. | |
| 4,568,509 A | * | 2/1986 | Cvijanovich et al. | 376/109 |
| 4,793,961 A | | 12/1988 | Ehlers et al. | |
| 4,994,706 A | | 2/1991 | Leung et al. | |
| 5,135,704 A | * | 8/1992 | Shefer et al. | 376/108 |
| 5,198,677 A | | 3/1993 | Leung et al. | |
| 5,215,703 A | * | 6/1993 | Bernardet | 376/114 |
| 6,094,012 A | | 7/2000 | Leung et al. | |
| 6,217,715 B1 | * | 4/2001 | Sun et al. | 204/192.12 |
| 6,907,097 B2 | * | 6/2005 | Leung | 376/108 |

OTHER PUBLICATIONS

Cox, Jr., et al., "Thermonuclear Reaction Listing With Cross-Section Data For Four Advanced Reactions,"Fusion Technology, Vo. 18, Sep. 1990, pp. 326-339.*
Lenz et al., "Profiling of titanium implanted into iron and nickel with the reaction 48Ti (p,γ)49V, Nuclear Instruments and Methods in Physics Research Section B:Beam Interactions with Materals and Atoms," vol. 28, Issue 2, Sep. 1987, Abstract.*
Bair et al., "Gamma-Ray and Neutron Yields from Proton Bombardment of Boron", Phys. Rev. 100, 21-24 (1955).*
Collins et al., "Corrections to the B-11(p, gamma)C-12 cross sections and its impliations," Phys. Rev. C 26, 332-338 (1982).*
Wand et al., "(p, n) quasifree excitations in p-shell nuclei at 186 MeV," Phys. Rev. C 50, 2438-2448 (1994).*
Antolak et al., "Active Interrogation Using Low-Energy Nuclear Reactions," Proceedings of SPIE, vol. 5923, p. Proc. of SPIE 592303-1—Proc. of SPIE 592303-9, (2005).

* cited by examiner

*Primary Examiner*—Rick Palabrica
(74) *Attorney, Agent, or Firm*—Fulbright & Jaworski LLP

(57) ABSTRACT

A cylindrical gamma generator includes a coaxial RF-driven plasma ion source and target. A hydrogen plasma is produced by RF excitation in a cylindrical plasma ion generator using an RF antenna. A cylindrical gamma generating target is coaxial with the ion generator, separated by plasma and extraction electrodes which has many openings. The plasma generator emanates ions radially over 360° and the cylindrical target is thus irradiated by ions over its entire circumference. The plasma generator and target may be as long as desired.

6 Claims, 6 Drawing Sheets

GAMMA SOURCE FOR ACTIVE INTERROGATION

CROSS-REFERENCE TO RELATED APPLICATIONS

This application claims priority to U.S. Patent Provisional Application 60/705,763, filed Aug. 5, 2005, which is incorporated by reference herein.

STATEMENT OF GOVERNMENTAL SUPPORT

The invention described and claimed herein was made in part utilizing funds supplied by the U.S. Department of Energy under Contract No. DE-AC03-76SF00098. The government has certain rights in this invention.

BACKGROUND OF THE INVENTION

1. Field of the Invention

This invention relates generally to detection of special nuclear materials, and, more specifically, to a compact, low-cost gamma ray generator to aid in such detection.

2. Background

Many non-intrusive active interrogation techniques utilize neutrons or gamma rays to detect special nuclear material (SNM) concealed in cargo. For active interrogation systems with neutron sources, neutron induced gamma rays are detected and, sometimes, transmitted neutrons are measured. Neutron induced gamma spectra of different materials are used as the fingerprints for them. Fast neutrons are often in use to obtain a deep penetration into large inspected objects and, thus, generate a very high background from surrounding materials. While this high background restricts the maximum screening speed of many neutron-based systems, neutrons also tend to activate the surrounding materials after an extensive long period of operation.

On the other hand, gamma-based systems detect neutrons produced from photonuclear reactions or transmitted gamma rays. Because the neutron production cross sections of many special nuclear materials due to photofission are much higher than that of most common materials, the neutron background in gamma-based interrogation techniques is fairly low. Furthermore, the induced radioactivity of surrounding materials due to gamma rays of less than 16 MeV is rather small due to the high threshold energy of photonuclear reactions. However, most existing gamma-based interrogation systems use electron linacs and microtrons to generate the gamma beams; thus, the deployment of these systems is limited by their size, complexity and high cost of ownership. Thus there is a need for low-cost, portable gamma sources to use in active interrogation systems to detect SNM.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

In general, cylindrical gamma generators can be designed using a coaxial RF-driven plasma ion source, as has been done earlier in U.S. Pat. No. 6,907,097 for neutron generators and is included by reference herein. A plasma is produced by RF excitation in a plasma ion generator using an RF antenna. A cylindrical gamma-generating target is coaxial with, or concentrically arranged around, the ion generator and is separated therefrom by plasma and extraction electrodes which can contain many slots. The plasma generator emanates ions radially over 360°, and the cylindrical target is thus irradiated by ions over its entire inner surface area. The plasma generator and target can be made as long as desired.

Figure 3:
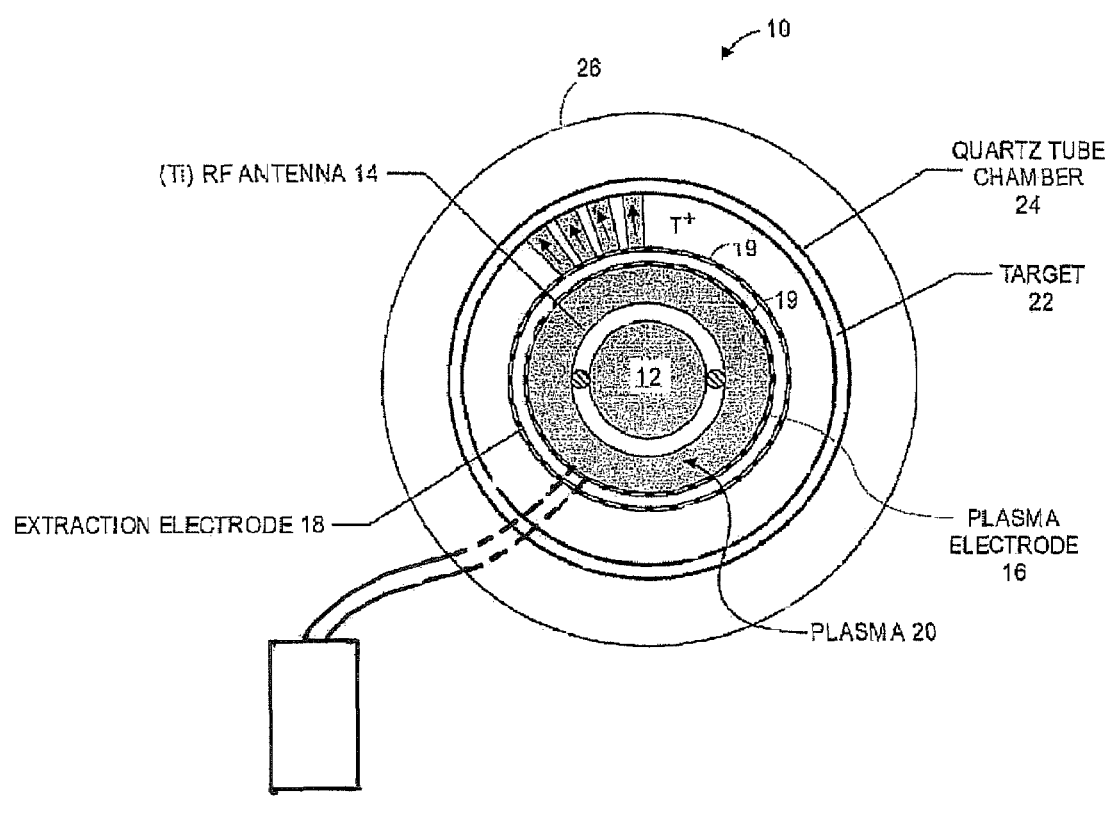
FIG. 3 shows cross-section view of a gamma source coaxial geometry according to an embodiment of the invention.
Figure 4:
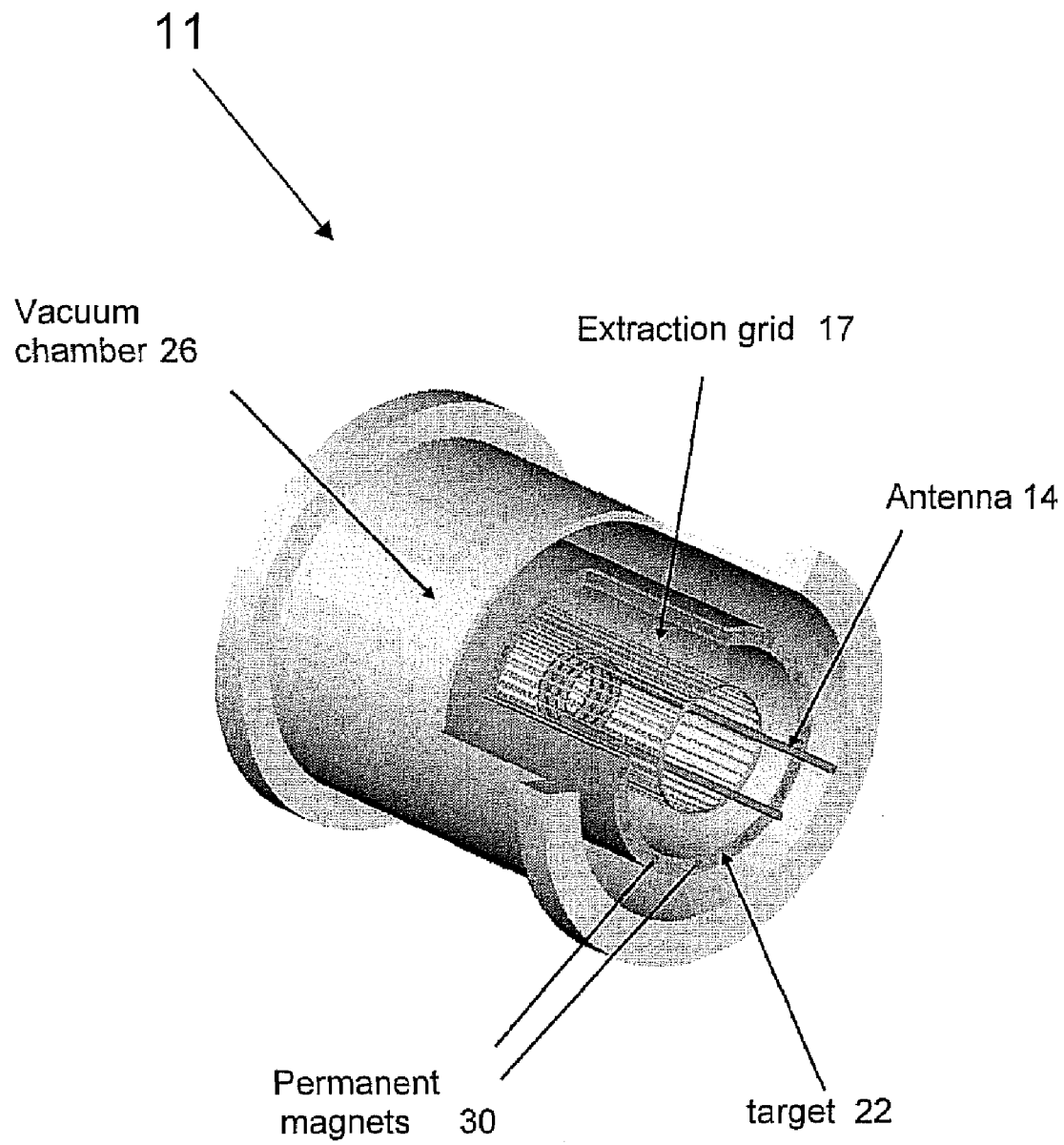
FIG. 4 is a schematic drawing of a coaxial gamma source.

A co-axial gamma-tube design has several advantages that would carry over from the neutron tube system. The advantages include (i) high beam current, (ii) good cooling, (iii) simple design, (iv) compactness, and (v) spatially uniform photon flux. FIGS. 3 and 4 show different schematic views of a coaxial type gamma source that is very similar to the neutron tube design.

For the (p,$\gamma$) target material, Table 1 lists four possible low-energy nuclear reactions that produce gamma-rays with energies greater than 6-MeV (the photofission threshold energy is approximately 5.5 MeV). Of these, the 163-keV $^{11}B$ and 203-keV $^{27}Al$ reactions may be the simplest to work with to create a gamma tube system through modification of co-axial neutron generator technology. Suitable target materials for these reactions include $LaB_6$ or $B_4C$ (for p-B) and Al (for p-Al), which are easy to fabricate and also have good thermal, electrical, and mechanical properties.

TABLE 1

| Four promising (p,$\gamma$) reactions for high energy gamma (6 to 18 MeV) production | | | | |
|---|---|---|---|---|
| | Gamma Energy E$\gamma$ (MeV) | Cross Section $\sigma$ (mb) | Proton energy $E_p$ (keV) | Target Fabrication |
| $^{11}B(p,\gamma)^{12}C$ | 16.1, 11.7, 4.4 | 0.16 | 160 | Easy |
| $^{27}Al(p,\gamma)^{28}Si$ | 11.5, 9.8, 1.8 | <0.03 120~180 | 202.8 632.2 | Easy |
| $^{19}F(p,\alpha\gamma)^{16}O$ | 6.1, 6.92, 7.12 | 160 | 340 | Difficult |
| $^{7}Li(p,\gamma)^{8}Be$ | 12.24, 14.74, 17.64 | 6 | 441 | Moderate |

Figure 1:
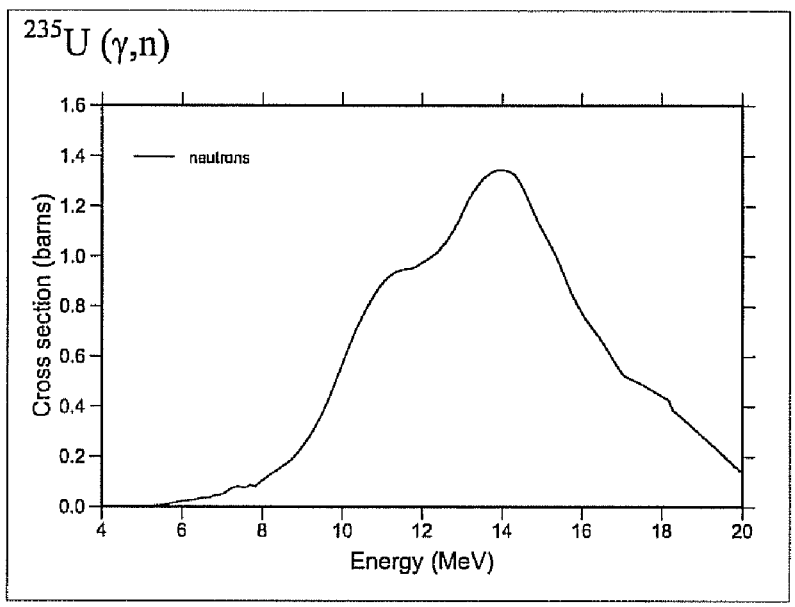
FIG. 1 is a graph showing photoneutron production cross-sections of $^{235}U$ ($\gamma$,n) as a function of energy.
Figure 2:
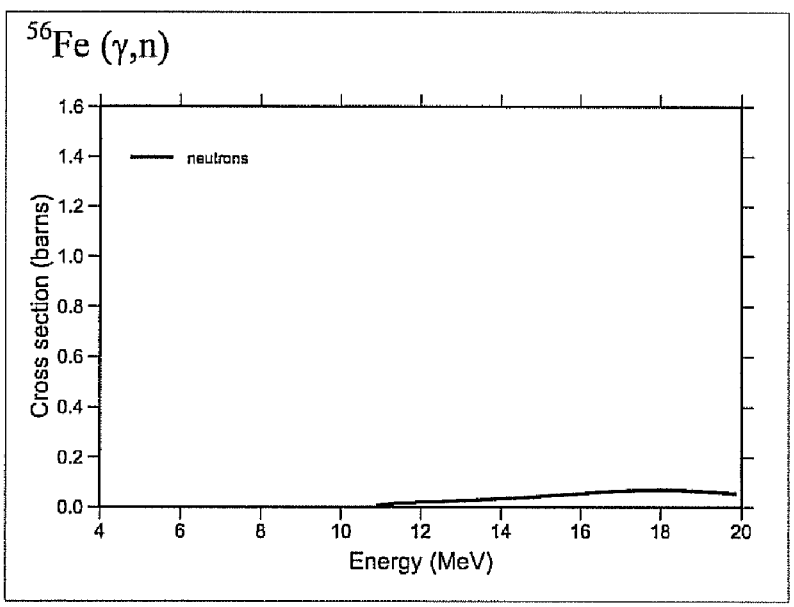
FIG. 2 is a graph showing photoneutron production cross-sections of $^{56}Fe$ ($\gamma$,n) as a function of energy.

The p-B based system is particularly suitable for special nuclear material (SNM) detection. More than 90% of the excited $^{12}C^*$ produced from a 160 keV proton beam hitting on a B target decays directly to its ground state. Therefore, a p-B gamma generator can produce an intense 16.1 MeV gamma beam. Many SNMs have a much higher photoneutron production cross-section at 16.1 MeV gamma energy compared to other common materials. For example, the photoneutron production cross-sections of $^{235}U$ at 16 MeV is ~0.7 b as shown in FIG. 1, while the photoneutron production cross-section of $^{56}Fe$ at the same energy is ~0.01 b as shown in FIG.

2. The p-B based system can use a high current, low energy coaxial accelerator system because of its relatively small (p,γ) cross section.

Lanthanum hexaboride ($LaB_6$) is a rigid ceramic with good thermal shock resistance and good chemical and oxidation resistance. $LaB_6$ also has high electron emissivity and good electrical conductivity. Similarly, boron carbide ($B_4C$) is one of the hardest materials known, ranking third behind diamond and cubic boron nitride. $B_4C$ has very good chemical resistance, good nuclear properties (commonly used as a neutron absorber in reactors), and has low density (2.52 g/cm$^3$). $B_4C$ can be formed as a coating on a suitable substrate by vapor phase reaction techniques, e.g., using boron halides or diborane with methane or another chemical carbon source.

The p-Al system reaction is also capable of detecting SNM and other contrabands because its branching ratios to different excited states are comparable to each other. Varying the proton beam energy can also change the energy level of $^{28}Si^*$ and, thus, the branching ratios. There are six resonances for the p-Al reaction between 500 to 680 keV. Gamma ray transmission spectroscopy can be used to detect elements besides SNM while neutron detectors can be used to monitor the presence of SNM. On the other hand, the system based on p-Al uses a modest-energy axial accelerator. Other possible materials to use as targets include $LaB_6$, $B_4C$, Al, LiF, Teflon™, and Mg.

The main drawback with both the p-B and p-Al reactions is their low cross sections which necessitate operating the gamma tube at a high proton current to increase the source output. For example, in a boron-based interrogation system, a co-axial source producing an ampere of proton current at the 163-keV reaction resonance will only generate about $6 \times 10^8$ gammas/sec. The next boron resonance occurs at a higher energy (675 keV) and its cross section is even smaller (0.05 mb). Similarly, the resonant nuclear reaction for aluminum at a proton energy of 203-keV has a cross section of less than 0.03 mb.

The other (p, γ) reactions in Table 1 have significantly larger reaction cross sections, but require scaling the gamma tube source voltage to higher energies. For the production of multiple discrete high-energy gammas, a beam of protons with energy greater than 340 keV are required. However, it is difficult to scale the coaxial tube design to these higher proton voltages. To achieve these higher energies, a simple axial accelerator concept can be used, as will be discussed later.

FIG. 3 shows cross-section view of a gamma source geometry according to an embodiment of the invention. Gamma generator 10 has a cylindrical plasma ion source 12 at its center. There is a cylindrical gamma generating target 22 disposed around and spaced apart from the cylindrical plasma ion source 12. The principles of plasma ion sources are well known in the art. Conventional multicusp ion sources are illustrated by U.S. Pat. Nos. 4,793,961; 4,447,732; 5,198,677; 6,094,012, which are herein incorporated by reference.

The ion source 12 includes an RF antenna (induction coil) 14 for producing an ion plasma 20 from hydrogen gas which is introduced from a hydrogen gas source 21 into the ion source 12. Antenna 14 is typically made of copper tubing which may be water cooled. For gamma generation, the plasma 20 is preferably a hydrogen ion plasma. The ion source 12 can also include a pair of spaced electrodes, plasma electrode 16 and extraction electrode 18, along its outer circumference. The electrodes 16, 18 control the passage of ions electrostatically from the plasma 20. The electrodes 16, 18 can contain many longitudinal slots 19 along their circumferences so that ions radiate out in a full 360° radial pattern. In an alternative embodiment (not shown), the electrodes 16, 18 can be grids.

Coaxially or concentrically surrounding ion source 12 and spaced therefrom is the cylindrical target 22. The target 22 is the gamma generating element. Ions from the plasma source 12 pass through the slots 19 in the electrodes 16, 18 and impinge on the target 22, typically with energy of 120 keV to 150 keV. The target 22 may be made of any of the materials listed in Table 1, or others. In one embodiment, the target 22 is made of $LaB_6$ or $B_4C$. In another embodiment, the target 22 is made of aluminum. Gamma rays are produced in the target 22 as the result of ion induced (p,γ) reactions. Outer cylinder 24 defines the vacuum chamber in which the entire assembly 10 is enclosed.

The extraction apertures in electrodes 16, 18 can be in the form of slots 19 whose length can be extended to any desired value. The hydrogen ion beam hits the target 22 in 360° and therefore the target area is very large. By making the gamma generator as long as practical in the axial or longitudinal direction, a high gamma flux can be obtained. For p-B gamma-based interrogation system, a long co-axial source that can produce ampere(s) of current is useful.

FIG. 4 is a schematic cutaway drawing of a coaxial type gamma source 11, which is very similar to a coaxial neutron generator design. A cylindrical ion source is located at the center of the gamma generator. Hydrogen plasma is formed by RF induction discharge. An antenna 14 can be water-cooled copper tubing enclosed inside a quartz tube. It has been demonstrated that RF discharge plasma is capable of generating atomic hydrogen ion species higher than 90%. An extraction grid 17 controls the passage of ions electrostatically from the plasma. The ions are accelerated across a gap and impinge on a target 22 with full 160 keV energy. Permanent magnets 30 are in a regular arrangement around the plasma source and running longitudinally to form a magnetic cusp plasma ion source. The principles of magnetic cusp plasma ion sources are well known in the art, as cited above.

To ensure reliable high voltage operation the gamma-ray generator 11 can also be vacuum pumped. With reasonable pumping, the pressure can drop to the $10^{-4}$ Torr range, which allows trouble free high voltage operation. The ion source can protected from the secondary electrons with a filter rod structure (not shown); this prevents high-energy electrons from accelerating back to the source and potentially over-heating it. The protection from the secondary electrons is especially important when generating gammas. Due to the fairly small cross-section of some of the nuclear reactions, the generator run at fairly high current, which can cause the ion beam power at the target to be on the order of 200 kW. Although the large surface area of the target helps to dissipate the thermal load, higher power operation of the gamma source may be more successful with appropriate target cooling systems, as have been used for neutron generators.

Figure 6:
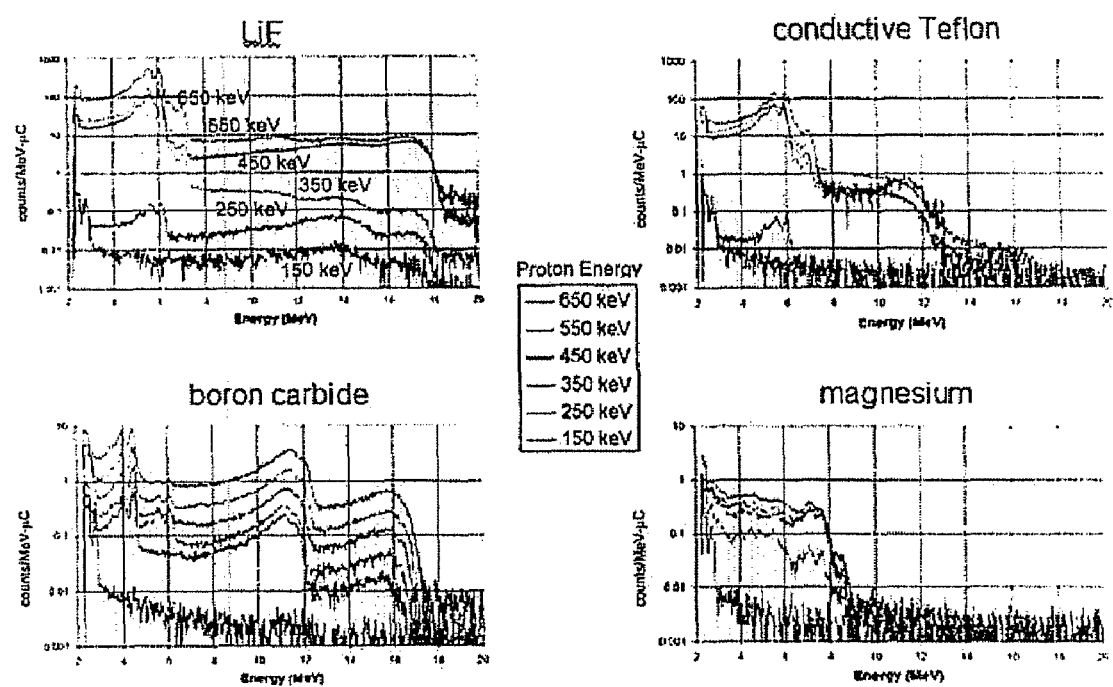
FIG. 6 shows gamma ray spectra were collected from LiF, Teflon, $B_4C$, and Mg bombarded with a continuous beam of protons.

FIG. 6 shows gamma ray spectra were collected from LiF, Teflon™, $B_4C$, and Mg bombarded with a continuous beam of protons. Each spectrum was collected with a 5-inch NaI detector and normalized to I-μC of charge. The (p,γ) target to detector distance was set at 7 cm. Both boron carbide and magnesium have rather low gamma-ray yield which is consistent with the reported $^{11}B$ cross section value given in Table 1. Magnesium was tested because it had been reported that a 6.19-MeV gamma-ray (in addition to 4.86-MeV and 0.82-MeV gammas) is produced corresponding to the 317-keV resonance of the $^{25}Mg(p,\gamma)^{26}Al$ reaction. The spectra clearly show the 6.19-MeV gamma-ray and also gammas that arise from higher energy (4-MeV) branching channels that can occur for the $^{25}$Mg(p,γ)$^{26}$Al reaction. The LiF and Teflon™ spectra are dominated by the characteristic 6.13-MeV fluorine gamma-ray which was even observed for 250-keV protons from the accelerator (fluorine has a small resonant cross section of –0.2 mb at 224-keV proton energy). As indicated in Table 1, the resonant reaction for lithium occurs at 441-keV which accounts for the significant jump in the measured yield between the 350-keV and 450-keV spectra. The Li reaction is of interest because it produces 17.64-MeV (63% emission/reaction) and 14.74-MeV (37% emission/reaction) gamma-rays which coincide well with the peak of the photofission cross section. There also appears to be an unidentified, weak low-energy nuclear reaction in Teflon that produces 12-MeV gammas and may be due to a trace impurity in the material.

Figure 5:
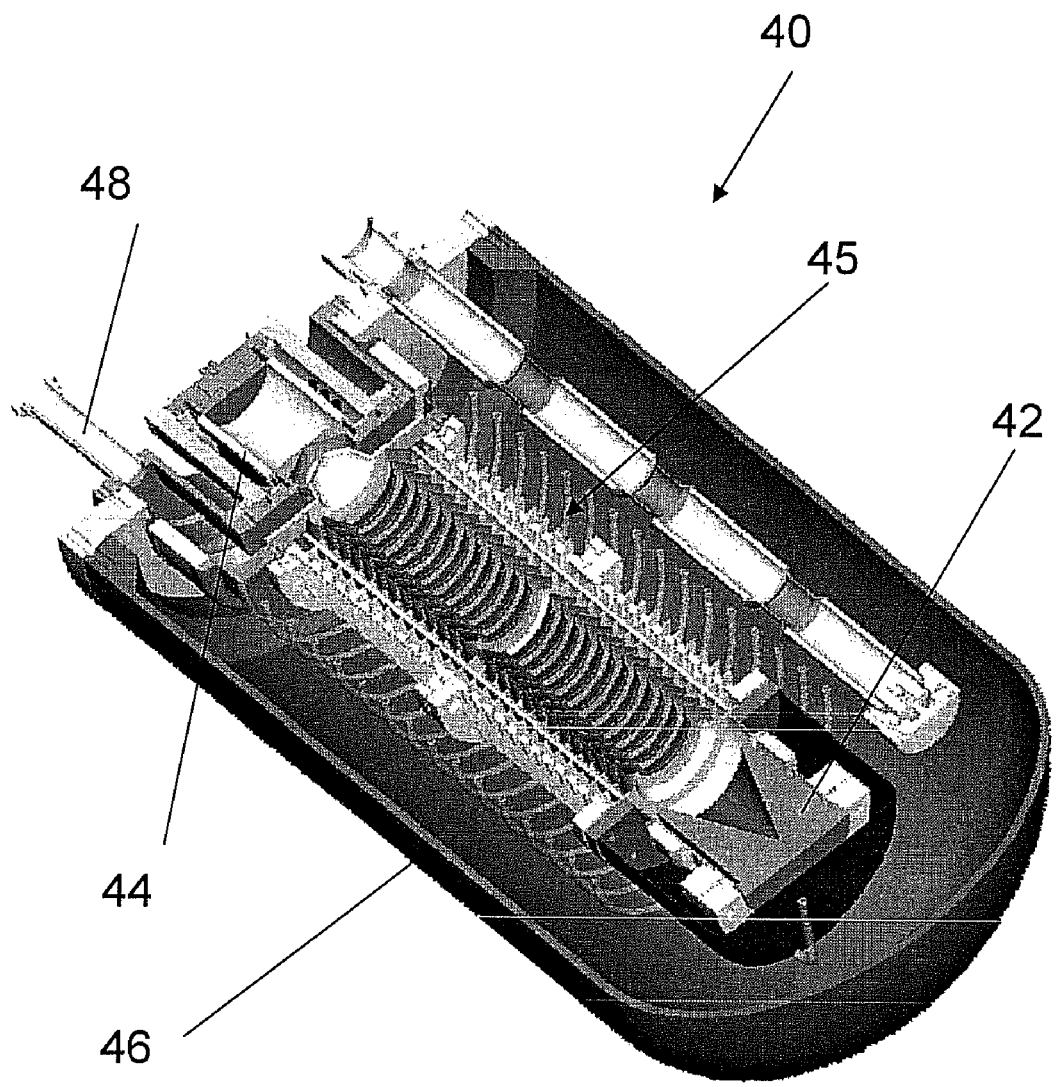
FIG. 5 a conceptual design of a simple axial gamma source.

As mentioned above, it is difficult to scale the coaxial tube design to proton voltages with energies greater than 340 keV, as are used for the larger cross section reaction shown in Table 1. To achieve these higher energies, a simple axial accelerator 40, as shown in FIG. 5, can be used. In this system, the protons are first produced in an rf-driven plasma source. The rf antenna is shown as 44. The protons are then extracted and accelerated to their full energy using a simple electrostatic accelerator column 45. The accelerated protons then impinge on a water-cooled, V-shaped target 42 (rather than a cylindrical target as in the coaxial design). The chamber 46 is vacuum pumped through a pumping port 48 to minimize the electrons produced by ionizing the gas in the beam path.

A significant advantage of the source designs is its potential to scale to almost any length by stacking together individual base units. For example, the coaxial gamma tube can be taken to an order of magnitude higher power level by stacking ten of the 1-Amp systems together. In the base units, the lower vacuum plate is at ground potential and the upper one is at the target potential (e.g., ~165 kV for the p-B reaction). These sources can be stacked on top of each other in a sequence, where two high voltage flanges are shared in one end of the two generators and, on the other end, the pumping chamber is shared with another generator. In this exemplary embodiment, the stack of ten generators can be operated with only five high voltage feeds, five vacuum pumps and five rf-systems.

Another embodiment of the invention integrates gamma-ray and neutron generators to produce a new active interrogation source. Owing to its linear scalability, the dual source may be useful for many diverse applications ranging from very large fixed site interrogation systems to intermediate-size mobile or remote inspection systems to compact systems for assaying the internal contents of hazardous waste drum containers.

Figure 7:
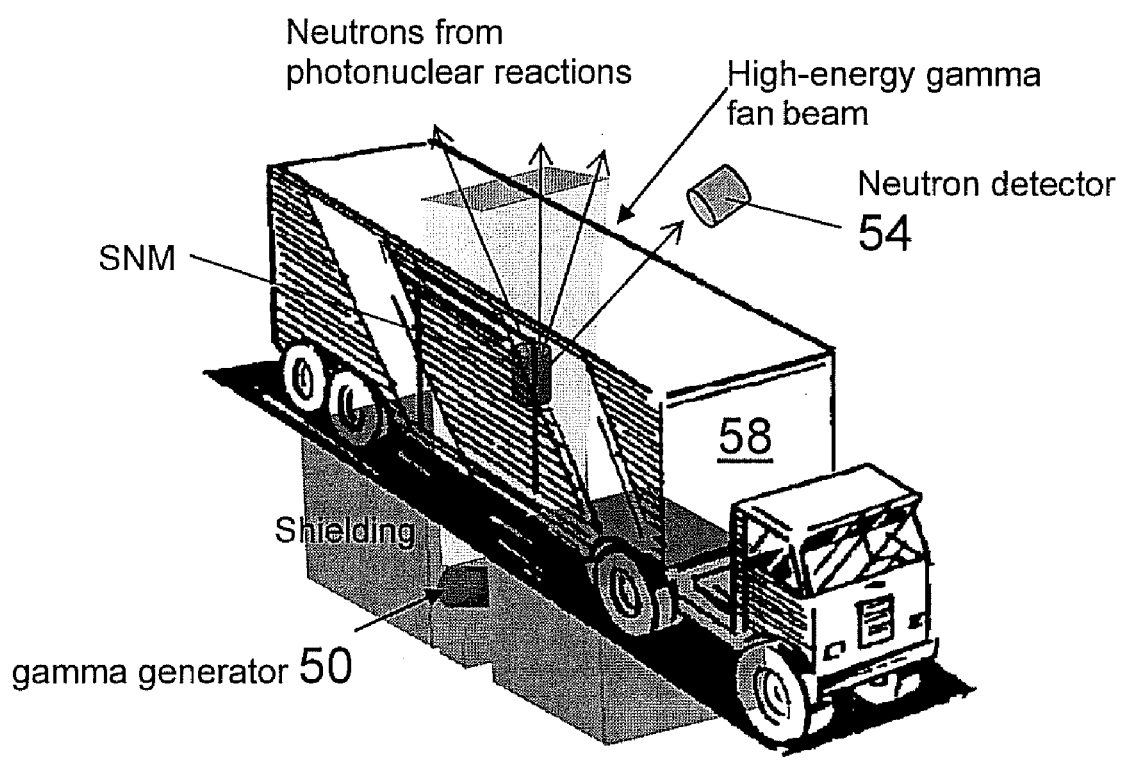
FIG. 7 is a schematic drawing a method to detect special nuclear materials according to an embodiment of the invention.

While a simple, compact, and low-cost gamma source design is important for the wide deployment of these gamma-based interrogation systems, a sophisticated detection system and a contraband database are also desirable in order to make the best use of these systems. FIG. 7 shows a conceptual drawing of an exemplary embodiment for an integrated system design. A gamma source 50 is located in the ground as an easy way to shield inspection workers from the radiation. An array of detectors (one neutron detector is shown as 54) is positioned around a cargo container 58 to monitor neutrons and gammas coming out of the container 58 for signals that indicate the presence of SNM. Some of the detectors are sensitive to both gammas and neutrons, as fission also produces a significant amount of prompt gammas. It would be useful to have a database of induced gamma/neutron ratios for various combinations of materials and packaging.

As discussed above for the p-Al based system, gammas of different discrete energies are produced by the gamma generator. Thus gamma detectors can be set on the top of the cargo container 58 for gamma transmission spectroscopy to identify other hazardous materials.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A cylindrical gamma ray generator, comprising:
   a cylindrical RF-driven plasma ion source for producing a hydrogen ion containing plasma;
   a hydrogen gas source in fluid communication with said plasma ion source whereby hydrogen gas can be introduced into said ion source;
   a cylindrically-shaped radial ion extractor system, the system disposed coaxially about the ion source for extracting hydrogen ions radially from the ion source; and
   a cylindrical target disposed coaxially outside and spaced from the ion source to receive hydrogen ions extracted from the source by the cylindrical extractor system, said target comprising a LaB$_6$ target material, which target material is capable of undergoing proton/gamma (p,y) reactions when irradiated by hydrogen ions having an energy below 675 keV emitted from said source to produce gamma rays, wherein said produced gamma rays have an energy level above 6 MeV.

2. The generator of claim 1, further comprising an RF antenna disposed within the ion source.

3. The generator of claim 2, further comprising water cooling within the RF antenna.

4. The generator of claim 1 wherein the cylindrically-shaped radial ion extractor system comprises a plurality of axially extending slots.

5. The generator of claim 1 further comprising a vacuum chamber disposed to contain the target.

6. The generator of claim 1, wherein the hydrogen ions have an energy of approximately 163 keV.

* * * * *